Oct. 9, 1951     M. H. RUMPF     2,570,720
APPARATUS FOR SCREW CUTTING AND FEEDS FOR MACHINE TOOLS
Filed Sept. 21, 1946     4 Sheets-Sheet 1

MARTIN HENRI RUMPF
INVENTOR

Oct. 9, 1951 M. H. RUMPF 2,570,720
APPARATUS FOR SCREW CUTTING AND FEEDS FOR MACHINE TOOLS
Filed Sept. 21, 1946 4 Sheets-Sheet 2

MARTIN HENRI RUMPF
INVENTOR
ATTY.

Oct. 9, 1951  M. H. RUMPF  2,570,720
APPARATUS FOR SCREW CUTTING AND FEEDS FOR MACHINE TOOLS
Filed Sept. 21, 1946  4 Sheets-Sheet 3

MARTIN HENRI RUMPF
INVENTOR

Oct. 9, 1951 M. H. RUMPF 2,570,720
APPARATUS FOR SCREW CUTTING AND FEEDS FOR MACHINE TOOLS
Filed Sept. 21, 1946 4 Sheets-Sheet 4
FIG.10.
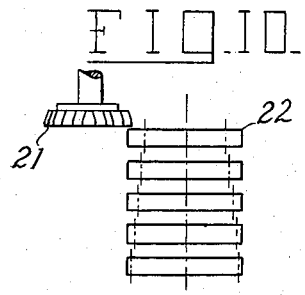
FIG.11.
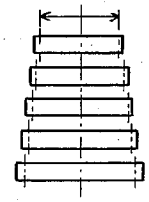
FIG.12.
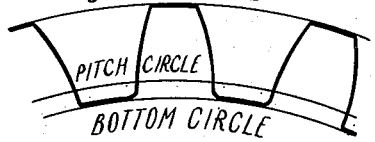
FIG.13. FIG.14.
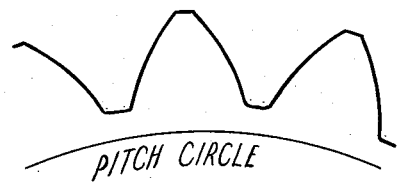 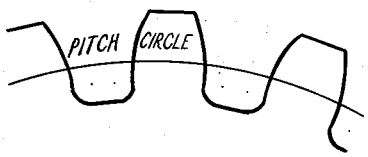
INVENTOR:
MARTIN HENRI RUMPF
BY
Richardson, David and Nordon
ATTORNEYS

UNITED STATES PATENT OFFICE 2,570,720

APPARATUS FOR SCREW CUTTING AND FEEDS FOR MACHINE TOOLS

Martin Henri Rumpf, Uccle-Brussels, Belgium, assignor to "Le Progrès Industriel, Société Anonyme," Loth, Belgium, a Belgian company Application September 21, 1946, Serial No. 698,474
In Belgium September 3, 1942

Section 1, Public Law 690, August 8, 1946
Patent expires September 3, 1962

3 Claims. (Cl. 74—342)

My present invention relates to apparatus for screw cutting and feeds for machine tools.

Machine tools (lathes, screw-cutting milling machines, grinding machines for screw threads) are provided at the option of the user with a metric or Whitworth (British thread) leading screw.

To these leading-screws, correspond in the pitch box, reduction ratios which, conjointly with the ratios of the "change wheels" permit executing ranges of pitch (ranges of metric, Whitworth, modulated, or diametral pitch). They may also provide a range of carriage feeds.

In order to facilitate manipulation for obtaining a feed or a fixed pitch taken from one of these ranges, it will be evident that it is important to provide in the pitch box reduction ratios such as allow of preserving the same ratio of change wheels for different ranges, for example (1) metric and Whitworth (2) modulated and diametral pitch.

The dismounting and remounting of these wheels may thus be done away with the obtaining of a pitch may be effected by the simple manipulation of levers.

It is known on the one hand that for the realisation of Whitworth pitch by means of a metrical feed screw or vice versa the number 127 being a multiple of 25.4 mm.=1 inch, a wheel of 127 teeth permits of giving through the ratios in which it comes into play a rigourously exact pitch, but for reasons of space taken up it is not generally possible to adapt in the pitch box ratios of reduction comprising this wheel of 127 teeth.

Absence of this wheel, therefore, imposes a search for ratios such that they may give, always without change of the change wheels, several different ranges of which the value of certain pitches, in default of being rigourously exact, only depart from the theoretical pitch by infinitesimal quantity, a quantity which is a function of the machining tolerances admissible in screw cutting.

The pitches comprised in a range are obtained in general independently of the manipulation of other levers, by the displacement of a tilting sliding gear called "Norton system"; this one sliding gear is displaced in front of a drum comprising a certain number of wheels. According to whether it is a question of a Whitworth, metric or modulated pitch sometimes the wheel controls the drum, sometimes the drum controls the wheel. That is an arrangement which provides a very simple combination regarding the number of wheels, sliding gears, etc.

However, the Norton sliding gear, besides the lack of absolute rigidity of the tilting system, necessitates for the manipulation of the lever a large recess in the front part of the housing; this recess, on the one hand, does not permit of lubrication by oil bath, the latter necessitating a hermetically sealed housing. On the other hand, the protection of the members of the gear box cannot be ensured with certitude against the introduction of filings, dust, etc.

Whilst admitting that, by a system of protection, one may attain, to some extent, a limitation of the inconveniences inherent in the recess, there remains nevertheless the inconvenience of the lack of rigidity of the tilting arrangement of which the removal can only be effected by a transformation of the whole of the device.

With a view to remedying these inconveniences there have already been constructed screw-cutting and feeding apparatus, disposed in a housing without a recess in front, and consequently entirely closed, allowing, by the displacement of a simple non-tilting sliding gear, the obtaining of different ranges of pitch and of feed, without the changing of the change wheels and without a wheel of 127 teeth having to be interposed in the reduction ratio.

The present invention relates to an apparatus of the kind characterized in that it comprises sliding gear-wheels which may be displaced by sliding on the same spindle and of which each meshes with at least two fixed wheels disposed about a single axis, having different numbers of teeth and of which the teeth as a development of a circle are corrected positively or negatively, so that the gearing is effected normally with the corresponding tilting gear, although the number of teeth of the fixed wheels may be different and the distance between centers may be constant.

The apparatus may comprise a plurality of fixed wheel spindles, each of the sliding wheels being able to simultaneously engage with fixed wheels belonging to several spindles, each of the latter transmitting alternatively the movement towards the delivery spindle of the apparatus.

The arrangement brings about for a number of equal speeds, an appreciable reduction in the length of the spindles relative to present arrangement in which each sliding wheel only gears with a single fixed wheel and in which the fixed wheels are all aligned on one and the same spindle.

Thes annexed drawings are intended to show how the invention may be practically embodied and also to illustrate its advantages.

Figure 4:
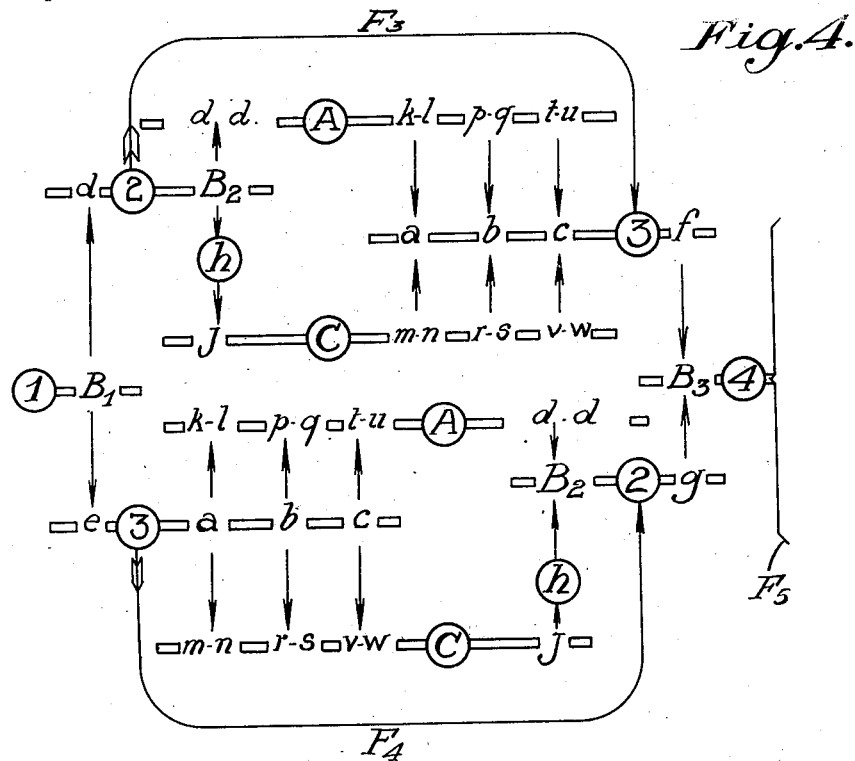

Fig. 4 schematically shows the transmission of the movement across the box.

Figs. 5, 6, 7 and 8 illustrate how a gear box constructed in accordance with the principles of the invention may be fixed on different plates having different dimensions.

Figure 9:
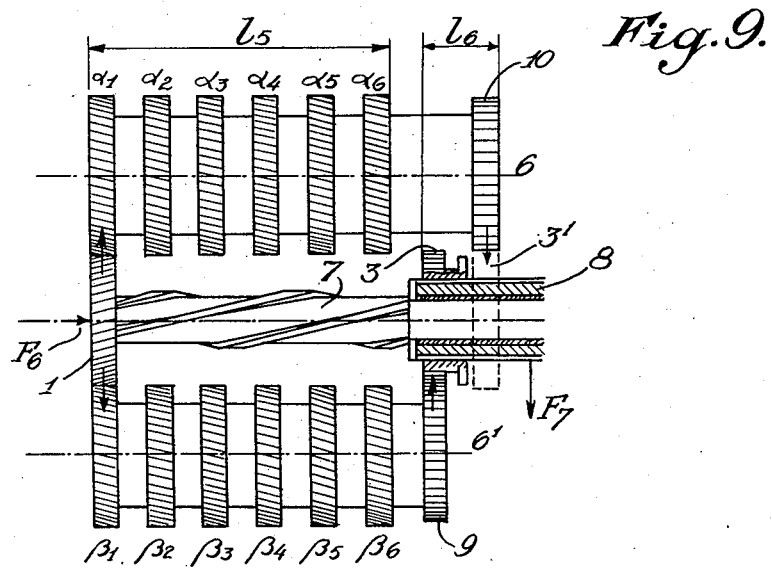

Fig. 9 is an illustrative example of a screw cutting apparatus in accordance with my invention.

Fig. 10 shows my invention as applied to a Fellow cutting tool.

Fig. 11 illustrates the Norton system, and

Figs. 12, 13 and 14 illustrate gear wheels schematically, the pitch circles being indicated on these figures.

Figure 1:
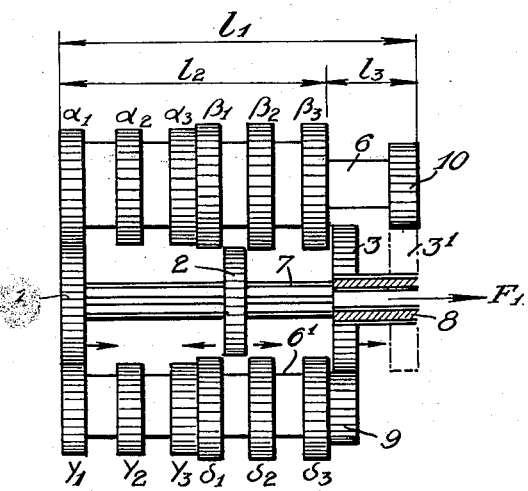
Fig. 1 shows a sliding wheel arrangement of the type according to the present invention.

As is shown in Fig. 1, the arrangement according to the present invention, employment is made of spindles 6—6¹ on which are keyed, on spindle 6, wheels $\alpha_1$, $\alpha_2$, $\alpha_3$—$\beta_1$, $\beta_2$, $\beta_3$ and on spindle 6¹ the wheels $\gamma_1$, $\gamma_2$, $\gamma_3$—$\delta_1$, $\delta_2$, $\delta_3$. On a spindle 7 parallel to the spindles 6—6¹ are mounted sliding wheels 1 and 2 which may slide on this spindle 7 and turn therewith.

The wheels mounted on the spindles 6 and 6¹ comprise four groups each wheel having a different number of teeth and their teeth are such that the gearing is normally effected with the corresponding sliding wheel 1—2, although the diameter of the wheel in each group is approximately the same and the distance between the centres is constant.

A sleeve 8 connected with the delivery spindle (not shown) carries a third sliding wheel 3 which may gear either with a wheel 9 fixed on spindle 6¹, or (after sliding into position 3¹) with a wheel 10 fixed on the spindle 6.

Thus there are obtained, by means of this arrangement, 12 different ratios, with 14 wheels and 3 single-wheeled sliding gears, of which two, sliding gears 1 and 2 give velocities properly so-called and a third (sliding-gear 2) transmits towards the delivery spindles the velocities obtained on one or the other of the spindles 6—6¹ carrying the fixed wheels.

Figure 2:
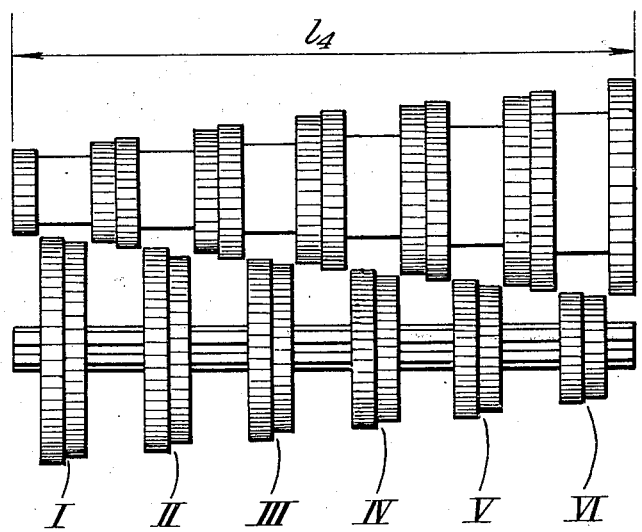
Fig. 2 shows a sliding wheel arrangement of known type.

In the known system, these 12 ratios can only be obtained by means of 12 wheels and of six sliding-gears with two wheels each, distributed on the same spindle, as illustrated in Fig. 2.

The gist of the invention lies in the meshing of a slidable wheel alternatively with several rigidly mounted wheels set on the same spindle, that have different numbers of teeth, but all having the same diameter.

The distance between the spindles is therefore constant and the spindle of the sliding gear may be fixed like that of the gear train.

Let us take a Fellow cutting tool 21 (Fig. 10). This tool may cut different numbers of teeth in round blanks 22 of the same diameter, for instance: 16, 17, 18, 19, 20 and 21 teeth or 22 to 28 teeth, etc.

Imagine this cutter replaced by a sliding gear wheel of same pitch and of same diameter. It will be easy to understand the possibilities for unvarying distances between the spindles, of making this wheel mesh with other rigidly mounted wheels having varying numbers of teeth.

This principle is capable of different applications. For instance, the same slidable wheel may mesh with wheels belonging to 2 (or more) sets of rigidly mounted wheels.

Let us take:

1. A series of gear wheels of the same pitch with different numbers of teeth and cut according to standard methods by the same Fellow cutter. This is the practice of the Norton system (Fig. 11).

The base diameter will vary in proportion to the number of teeth according to the relation:

$$D_b = M.N \cos^a$$

where

M = pitch of the cutting tool
N = number of teeth
$a$ = pressure angle of the cutting tool.

Remembering that the pitch circle is that from which the involute of the circle originates that forms the cutting edge of the tooth (Fig. 12), the pitch circle governs the basic characteristics of a gearing with teeth defined by the involute of a circle.

2. A series of wheels cut under the same conditions having the same numbers of teeth as the preceding ones and all with the same outside diameter, which is comprised within the range corresponding to the wheels considered in the case of the Norton system. (Fig. 10.)

The pitch circles remain superposed in the same way. But it should be noticed that the outlines of the gearings undergo changes, in relation to the standard profile, in proportion to the number of teeth of the wheels (Figs. 13 and 14). These changes express a variation of the pitch and of the pressure angle. All the wheels remain linked together by the invariability of the base pitch, their pitch and their angle comply with the relation:

$$\pi M \cos a = \pi M' \cos a' = \pi M'' \cos a'' = \ldots$$

In practice, it is advisable to take into consideration the figure for lag, thickness of teeth at their apex and at their base, so as to keep these elements within acceptable ranges.

By taking into account these elements it is possible to ensure the same uninterrupted meshing as in the case of standard gearings and even to improve, for certain ratios, the specific sliding capacity.

It will be understood that the more the number of velocities or speed changes required increases, the more possibilities there are by means of the arrangement according to the principle shown in Fig. 1, of comparatively reducing the number of sliding gears and the length of the whole arrangement. This diminution in length itself allows for an equal reduction in diameter of the spindles, of the weight of the latter and, in consequence, of reduction of the forces of inertia, independently of the economy effected in material.

The sliding gears 1, 2 each comprise a single wheel and are actuated by a single lever acting on a cam, articulated levers or other means.

The advantages of this arrangement are of two kinds:

(a) The employment of a single lever considerably simplifies the manipulation and reduces to a minimum the risks of errors starting from the necessary manipulation for the obtaining of a given thread or of a given feed;

(b) The cam or articulate levers avoids the simultaneous displacement of the sliding gears; in fact, in the case of a plurality of levers, it would be necessary to provide a security arrangement relatively complicated (grooved sectors, locking plungers, etc.). On the other hand, starting from the manipulation, it will be necessary, before actuating the lever controlling the sliding gear corresponding to the desired pitch or to the desired feed, to bring back to the dead or disengaged position the sliding gear in use.

Figures 3, 5, 6, 7, 8:
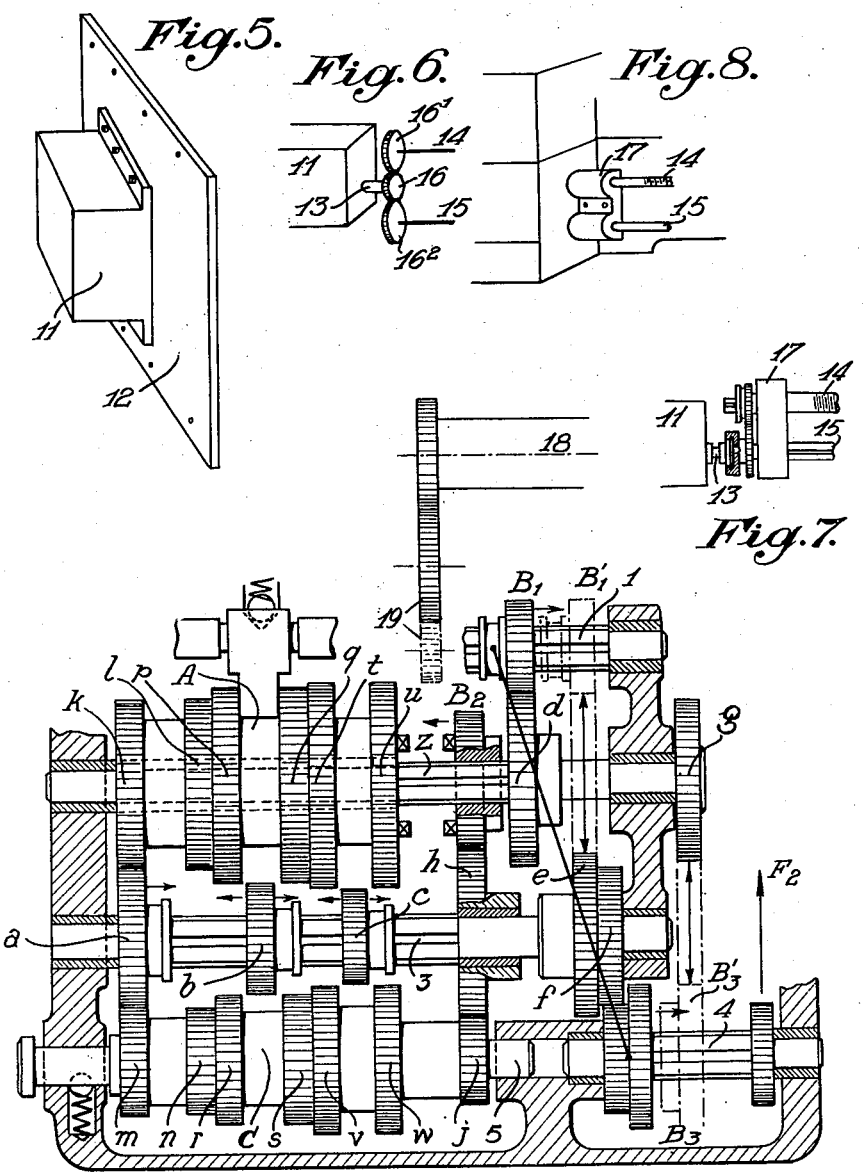
Fig. 3 is a sectional view of a box constructed in accordance with the invention.

Fig. 3 shows a developed view of the general elements of a change speed-gear box which is the object of the present invention as applied to a lathe.

In this gear-box, the spindle 18 drives a spindle 1 by means of change wheels schematically illustrated at 19. On this spindle 1 there may slide a sliding gear B.1 simultaneously with a sliding gear B.3 keyed to spindle 4.

The sliding gear B.1 may gear with a wheel $d$ keyed on the spindle 2 or with a wheel $e$ keyed to the spindle 3. The sliding gear B.3 may engage with a wheel $f$ also keyed on the spindle 3 or with the wheel $g$ keyed on the spindle 2.

The spindle 2 carries a sliding gear B.2 and a drum A freely turning on this spindle. The sliding gear B.2 may drive either the drum A by means of direct engagement or by an intermediate wheel $h$ turning freely on 3 and wheel $j$, it may drive a drum C turning freely on spindle 5.

The sliding wheel $a$ may engage with wheels $k, l, m, n$.

The sliding wheel $b$ may engage with the wheels $p, q, r, s$.

The sliding wheel $c$ may gear with the wheels $t, u, v, w$.

The sliding of these wheels $a, b, c,$ is effected by a single lever acting through the intermediate agency of a cam.

The simultaneous displacement of the sliding gears B.1 and B.3 renders either spindle 2 of the driving spindle of the spindle 3 (for obtaining a metrical pitch) or the spindle 3 the driving spindle of the spindle 2 (for obtaining Whitworth pitch), the drive coming initially from spindle 1. The diagram 4 schematically illustrates the above-mentioned arrangement.

In the position illustrated, in Fig. 3 for the sliding gears B.1—B.3, and the sliding gear B.2, the sliding gear B.1 actuates the wheel $d$ which drives the spindle 2, and the transmission is effected through B.2, the wheels $h$, $j$, $m$, the wheel $a$, the spindle 3, the wheel $f$, the sliding gear B.3 and the spindle 4.

When the sliding gears B.1 and B.3 are displaced to their alternative positions, transmission is effected by the wheel $e$, the spindle 3, the wheel $a$, the wheel $m$, the wheels $j$, $h$, B.2, the wheel $g$, the sliding gear B.3 and the spindle 4.

The different velocities are transmitted by the spindle 4 which, through the intermediate agency of the different fixed ratios, for example 1/1, 1/2, 1/4 and 1/8, controls the head screw and the carriage feed shaft.

With the object of utilizing one and the same gear box for various kinds of machines, the housing 11 (Fig. 5) in which are lodged the various members illustrated in Fig. 3, is formed so as to allow of its being fixed to different plates 12 of which the dimensions vary according to the structure in which they are fixed.

In the case of a lathe, the output spindle 13 (Fig. 6) of the changer speed gear 11 controls the lead screw 14 and the feed shaft 15 through the intermediate agency of the gears 16—16¹—16².

The bearings of the lead screw 14 and the bearings of the feed shaft 15 are disposed in an independent support 17 (Fig. 8) fixed to the structure.

It is thus possible to ensure the action of the box with the lead screw and the feed shaft whatever be their positions imposed by the technical features of the machine.

The housing thus disposed, and fixed to an independent plate permits therefore of the utilization of the same change-speed gear box for various types of machines for which:

(a) The structures may be different;
(b) The positions of the lead screw and of the feed shaft may be any suitable ones relative to the delivery spindle of the box.

The principle of gearing sliding gear with several fixed wheels of the same diameter but with small differences in their numbers of teeth may be applied not only in the case of a wheel with straight teeth but also with wheels with helicoidal teeth.

Fig. 9 illustrates by way of example a screw cutting apparatus comprising this modification.

In this apparatus, employment is made of spindles 6—6¹ on which are keyed, on spindle 6, the wheels with helicoidal teeth $a_1, a_2, a_3 \ldots a_6$ and on spindle 6¹, the wheels $\beta_1, \beta_2 \ldots \beta_6$ also with helicoidal teeth. On the spindle 7 parallel to spindles 6—6¹ and provided with a helicoidal key groove, is mounted a sliding gear 1 which may slide on this spindle 7 and turn therewith.

As for Figs. 1-4, 3 designates a sliding gear which can engage either with a fixed wheel 9 on the spindle 6¹, or (after sliding into the position 3¹) with a fixed wheel 10 on the spindle 6. This sliding gear 3 is carried by a sleeve 8 in relationship with the output spindle (not shown).

Thus the number of wheels of the same external diameter but comprising different numbers of teeth with which the same sliding gear may engage may be increased by this arrangement.

Having now particularly described and ascertained the nature of my invention, and in what manner the same is to be performed, I claim:

1. In a screw-cutting and feed-movement gear for machine-tools, in combination with a first spindle, a slidable gear mounted on said first spindle and adapted to turn therewith, a plurality of other spindles parallel to the first spindle, wheels rigidly mounted and set on said other spindles, all the fixed wheels belonging to the same spindle having different numbers of teeth, all having the same outside diameter and the teeth of which are defined by the involute of a circle, the sliding gear wheel being adapted to engage simultaneously and correctly with the fixed wheels belonging to different spindles, a driven spindle and means whereby each of the latter transmits alternatively the movement towards the driven spindle.

2. In a screw-cutting and feed-movement gear for machine-tools, in combination with a first spindle, slidable gears mounted on said first spindle and adapted to turn therewith, a plurality of other spindles parallel to the first spindle, groups of wheels rigidly mounted and set on said other spindles, all the fixed wheels of one group having different numbers of teeth, all having the same outside diameter and the teeth of which as an involute of a circle are corrected positively or negatively so that the engagement can normally take place with the sliding wheel corresponding to one group, and each sliding wheel being adapted to engage simultaneously and correctly with the fixed wheels of groups belonging to different spindles, a driven spindle and means whereby each of the latter transmits alternatively the movement towards the driven spindle.

3. In a screw-cutting and feed-movement gear for machine-tools, in combination with a first spindle, a slidable gear mounted on said first spindle and adapted to turn therewith, a plurality of other spindles parallel to the first spindle, wheels rigidly mounted and set on said other spindles, all the fixed wheels belonging to the same spindle having different numbers of teeth, all having the same outside diameter and the teeth of which as an involute of a circle are corrected positively or negatively so that the engagement can normally take place with the sliding wheel, the sliding gear wheel being adapted to engage simultaneously and correctly with the fixed wheels belonging to different spindles, a driven spindle and means whereby each of the latter transmits alternatively the movement towards the driven spindle, although the number of teeth of the fixed wheels is different and the distance between the axis of the spindles is constant.

MARTIN HENRI RUMPF.

REFERENCES CITED

The following references are of record in the file of this patent:

UNITED STATES PATENTS

| Number | Name | Date |
|---|---|---|
| 706,186 | LeBlond | Aug. 5, 1902 |
| 772,246 | Miller | Oct. 11, 1904 |
| 1,269,944 | Leonard | June 18, 1918 |
| 1,520,545 | Murphy | Dec. 23, 1924 |
| 1,756,917 | Tenny | Apr. 29, 1930 |
| 1,984,039 | Sieg | Dec. 11, 1934 |
| 2,205,473 | Fishburn | June 25, 1940 |
| 2,415,125 | Davenport | Feb. 4, 1947 |

FOREIGN PATENTS

| Number | Country | Date |
|---|---|---|
| 420,562 | Germany | Oct. 23, 1925 |
| 735,414 | France | Nov. 8, 1932 |